July 31, 1945.   G. W. CROWDER   2,380,725
CABLE TOOL
Filed Nov. 4, 1943   2 Sheets-Sheet 1
Fig. 1.
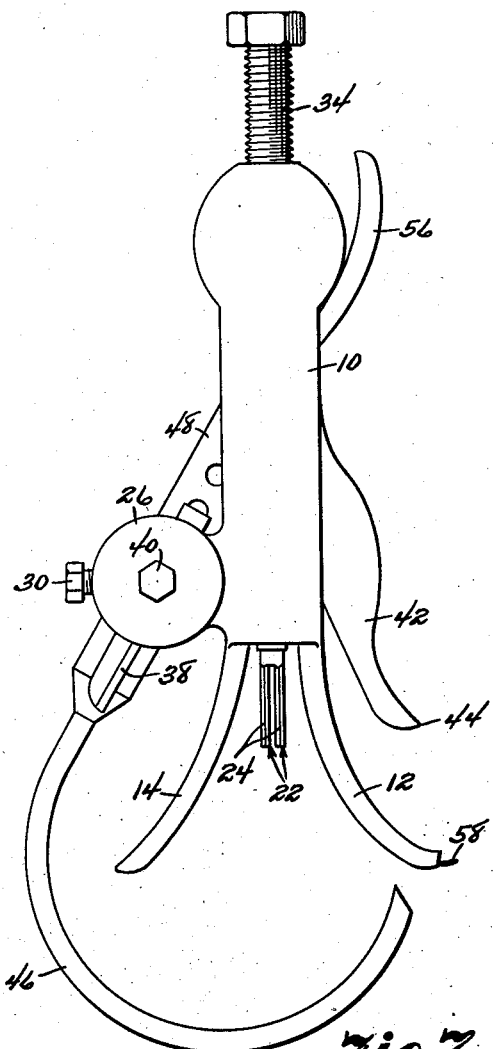
Fig. 2.
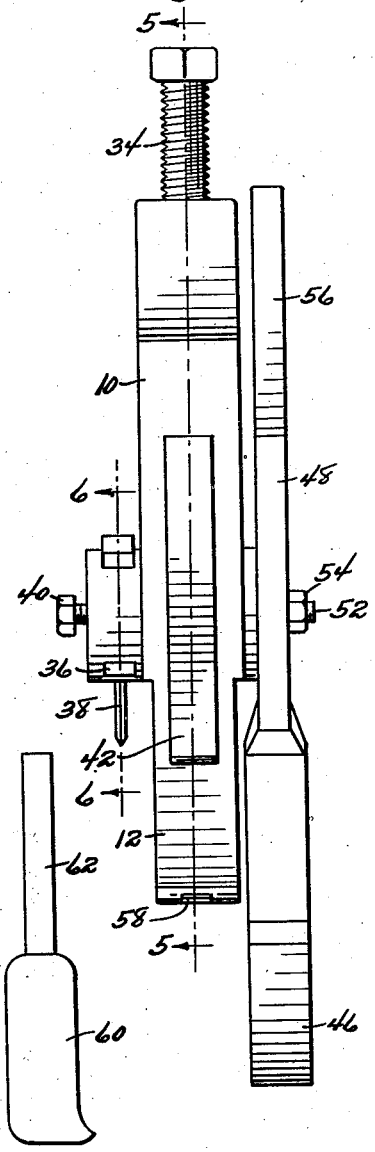
Fig. 7.
George W. Crowder INVENTOR.
BY
Victor J. Evans & Co.
ATTORNEYS

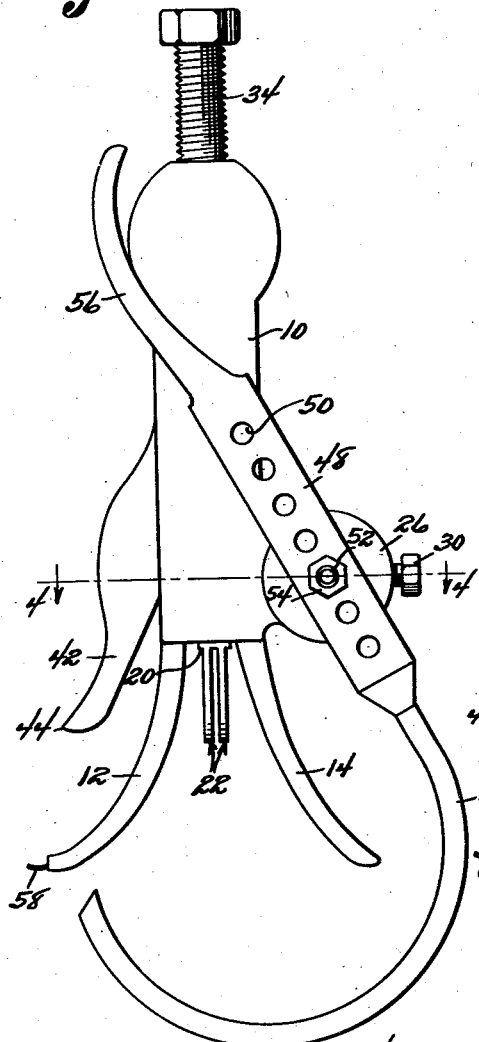
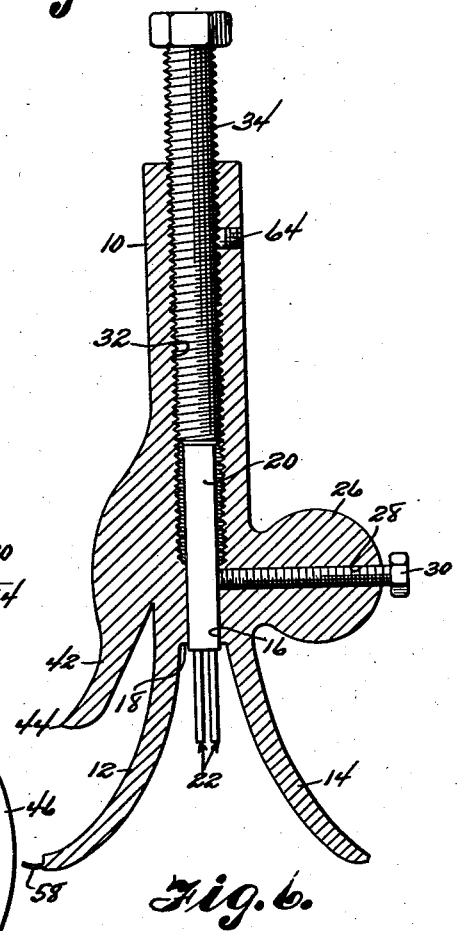
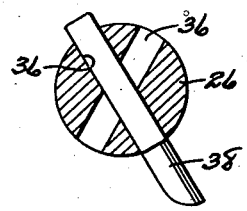
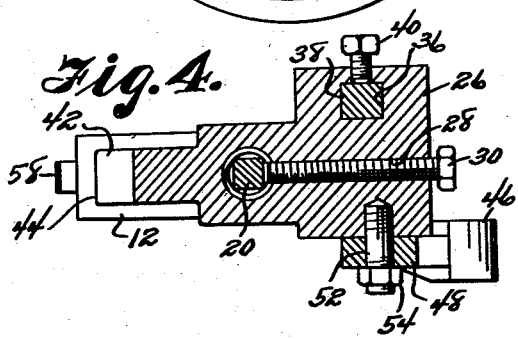

Patented July 31, 1945

2,380,725

UNITED STATES PATENT OFFICE 2,380,725

CABLE TOOL

George W. Crowder, Los Angeles, Calif.

Application November 4, 1943, Serial No. 509,020

5 Claims. (Cl. 30—91)

My invention relates to the removal of insulation and armor lead or the like from telephone, marine, power, signal cable and the like, and has among its objects and advantages the provision of an improved cable tool designed to facilitate cutting of the insulation and stripping the same from the cable.

In the accompanying drawings:

Figure 1 is a side view of the tool.

Figure 2 is a view of the tool rotated 90 degrees.

Figure 3 is a view similar to Figure 1 but rotated 180 degrees.

Figure 4 is a sectional view along the line 4—4 of Figure 3.

Figure 5 is a sectional view along the line 5—5 of Figure 2.

Figure 6 is a sectional view along the line 6—6 of Figure 2, and

Figure 7 is a view of a blade which may be employed in the tool.

In the embodiment of the invention selected for illustration, I make use of a body or handle 10 to one end of which are attached two diverging jaws or prongs 12 and 14. These jaws are characterized by gentle curvatures outwardly from each other. The handle 10 is provided with a square opening 16 arranged axially of the handle and passing through the end 18 between the jaws 12 and 14. A shank 20 is receivable in the opening 16 and carries two grooving blades 22 lying between the jaws 12 and 14 and bisecting the angle therebetween. These blades are spaced close together and have cutting edges 24 extending along one edge thereof and across their outer ends.

When cutting a groove longitudinally of the cable, the latter is placed between the jaws 12 and 14 to bring the blades 22 in cutting engagement with the insulation. Then the tool may be pulled longitudinally of the cable, with the jaws functioning as guides so that a straight line cut may be made, with the tool guided firmly along the cable. The blades 22 may be adjusted to different positions to accommodate cables of different diameters, since the shank 20 is slidable in the opening 16. This shank is of the same contour as the opening so as to be restrained from rotation. The handle 10 includes a lateral projection 26 provided with a threaded bore 28 arranged at right angles to the opening 16. A set screw 30 is threaded into the bore 28 to secure the shank 20.

A threaded bore 32 is provided in the handle 10, which bore is coaxial with the opening 16. A long screw 34 is threaded in the bore 32 and functions as an abutment for the shank 20. The blades 22 may be easily adjusted by inverting the tool and adjusting the screw 34 to bring the cutting blades to the desired position, after which the screw 30 is tightened.

The projection 26 is provided with transverse openings 36 for selective reception of a blade 38 which may be employed in cutting the insulation armor and sheathing circumferentially of the cable. This blade lies in a plane paralleling the plane of the jaws 12 and 14. A set screw 40 is provided for securing the blade 38 in different positions. The openings 36 are arranged at acute angles to the longitudinal axis of the handle 10, so that the blade 38 will be arranged at an acute angle to the axis of the handle 10 when positioned in either opening 36.

A lip 42 projects from one side of the handle 10, which lip terminates in a sharp edge 44 and may be used to remove the sheathing or armor from the cable after it has been cut along predetermined lines.

To one face of the projection 26 is mounted a hook 46 provided with a straight shank 48 having a plurality of openings 50 for selective reception of a pin 52 threaded into the projection 26. The shank is pivotally mounted on the pin 52 and is held thereon by a nut 54 threadedly connected with the pin. A handle 56 continues from the shank 48. The hook 46 lies in a plane paralleling the plane of the jaws 12 and 14, but is positioned slightly to one side thereof, and on the side opposite the blade 38.

The jaw 12 is provided with a blade element 58 which may be employed in removing the outer sheath or lead or the like covering.

The hook 46 is employed in holding the cable in place while cutting the longitudinal or circumferential grooves.

A blade 60 is provided with a shank 62 receivable in the hole 16. A set screw 64 is threaded in the handle 10 to engage the screw 34, and fixedly relate the blade 60 thereto. This blade may be used for several services, as a cable knife, skinning knife, etc.

In operation, when it is desired to cut a longitudinal groove in a cable, the blades 22 are adjusted to project the desired distance, and the screw 34 adjusted to provide an abutment for the blades: The set screw 30 is then tightened up to hold the blades in adjusted position. The cable (not shown) is then placed between the jaws 12 and 14 to bring the blades in cutting engagement with the insulation, and by grasping the handle 10, the tool is drawn along the cable to make the cut. When it is desired to cut insulation the blade 38 is fixed in the proper position in one of the openings in projection 26 and by grasping the handle 10 the cut is made. The lip 42 having an edge 44 is used to remove sheathing or armor from cable after it has been cut, and the blade 58 on jaw 12 for removing lead or the outer sheath covering. Blade 60 when mounted may be used for either a cable or a skinning knife, and the hook 46 is for holding a cable within jaws 12 and 14 when a longitudinal or circumferential groove is being made in the cable.

Without further elaboration, the foregoing will so fully explain my invention, that others may, by applying current knowledge, readily adapt the same for use under various conditions of service.

I claim:

1. An insulated cable tool, comprising an elongated handle having a bore extending axially therethrough, a part of which is threaded, an abutment screw extending from one end into the threaded part of the bore, a pair of curved, relatively diverging jaws carried at the other end of the handle to hold a cable, an adjustable hook shaped member attached to the handle and projecting across the jaws but spaced therefrom to engage a cable in the jaws, and an adjustable knife element in the unthreaded part of the bore and projecting between the jaws to contact and cut the insulation of a cable held between the jaws and the hook.

2. The invention as defined in claim 1, wherein the knife element has spaced parallel blades formed on a shank, said shank being adjustably received in the bore.

3. The invention as defined in claim 1, wherein the hook element has a straight shank provided with a plurality of aligned spaced openings, and the handle has an attaching means for the shank including a pin receivable through a selected one of the openings and a nut to hold the shank thereon.

4. The invention as defined in claim 1, wherein the hook element has a straight shank arranged at one side of the handle terminating in a handle part and provided with spaced, aligned openings, and wherein the handle has a pin thereon recurable in a selected one of the openings and a nut for tightening the shank on the pin.

5. The invention as defined in claim 1 wherein the handle has a lateral projection formed with a threaded bore communicating with the bore in the handle and having a screw therein for tightening against the shank of the knife to hold the knife in position in the handle.

GEORGE W. CROWDER.